April 16, 1968  B. B. SCHWAB  3,378,014
AUTOMATIC FILING ARRANGEMENT
Filed Feb. 12, 1965  5 Sheets-Sheet 1

INVENTOR.
BRUCE B. SCHWAB
BY Fraser and Bogucki
ATTORNEYS

April 16, 1968 B. B. SCHWAB 3,378,014
AUTOMATIC FILING ARRANGEMENT
Filed Feb. 12, 1965 5 Sheets-Sheet 2

INVENTOR.
BRUCE B. SCHWAB
BY Fraser and Bogucki
ATTORNEYS

April 16, 1968  B. B. SCHWAB  3,378,014
AUTOMATIC FILING ARRANGEMENT
Filed Feb. 12, 1965  5 Sheets-Sheet 5

INVENTOR.
BRUCE B. SCHWAB
BY Fraser and Bogucki
ATTORNEYS

United States Patent Office 3,378,014
Patented Apr. 16, 1968

3,378,014
AUTOMATIC FILING ARRANGEMENT
Bruce B. Schwab, 10613 3rd Ave.,
Inglewood, Calif. 90303
Filed Feb. 12, 1965, Ser. No. 432,275
9 Claims. (Cl. 129—16.1)

This invention relates to automatic filing systems and, more particularly, to an arrangement for automatically retrieving a particular card from a set of like cards filed in random order.

It has become generally known that the rate at which records are being generated and the number of papers which must be maintained in the course of day-to-day operations of even a small business office are reaching choking proportions. In the field of science and technology, the quantity of knowledge is increasing exponentially and it has been estimated that the rate of growth is now such that the amount of recorded knowledge is doubling every fifteen years. The United States Patent Office presently keeps track of some 10 million documents in attempting to determine whether an invention is novel or not. A typical large corporation in the aerospace industry has 4 million company documents which must be filed so that they can be located when needed. Even a small office may have a significant amount of storage space devoted to files containing correspondence, invoices, reports and various other papers to which reference may be needed from time to time. The regulations and requirements of various taxing authorities dictate the retention of many records which were formerly discarded in the course of business.

Various filing systems have been devised for the purpose of storing and retrieving the multitude of documents required in normal business operations. In a small business office, the filing system may involve arranging files in various categories and indexing or ordering the documents in a given category alphabetically, chronologically, numerically or otherwise. In a large business entity, the contents of documents may be recorded on microfilm or some other reduced size image for storage, and then located by the use of specialized equipment which rapidly searches the reproduced files and provides a copy of the desired document. In special cases, the contents of documents may be stored in memory devices which are then searched by computer techniques when a document is to be found. In the last mentioned case, computer controlled storage and retrieval may be conventionally employed in conjunction with what are referred to as informtaion retrieval systems. Information retrieval is to be distinguished from document retrieval, since the latter case is concerned with the retrieval of a specific item, whereas in information retrieval the particular information desired is to be reproduced from storage, regardless of the documents containing this information. It will be noted that the present invention is more directly concerned with the problems of document retrieval, although particular concepts of the invention may be applicable in the field of information retrieval as well. In particular, the invention is concerned with a filing system for the storage and retrieval of cards containing reduced images of original documents, thus substantially eliminating the space storage problem—at least with respect to providing space to make the original documents readily available. Arrangements in accordance with the invention are particularly effective when used in conjunction with special equipment for displaying the reproduced documents stored as reduced images on a stored card, automatically retrieved.

Most presently known arrangements providing for the storage and retrieval of particular documents from a filing system are not considered entirely satisfactory. Most such systems require the filing of a given document at a particular location in the system. In the case of computer storage of information contained in documents, the storage location is referred to as an address. In the case of computer storage, arrangements are known which provide for the storage and retrieval of information from particular addresses which are automatically generated from an analysis of the population of items being filed. However, this is a specialized application and, even in such a system, any item which is not filed at the particular location where it should be is lost insofar as the retrieval effort is concerned. In the conventional filing system, whether it be in a small office or a large corporation, if an item becomes misfiled so that it is not in the particular location where it should be according to the filing system employed, it becomes lost in the system insofar as document retrieval is concerned.

One particular document retrieval system is disclosed in my copending patent application Ser. No. 378,718 filed June 29, 1964, for an Automatic Filing System. The present invention, while generally applicable in the various types of systems described therein, relates particularly to an improved arrangement for storing and retrieving uniform cards filed at random.

In general, therefore, it is an object of the present invention to provide an improved arrangement for retrieving items from a filing system for business documents and the like.

It is a more specific object of the present invention to provide an improved automatic filing system having the capability of retrieving any items stored therein in response to the input of particular information identifying the item which may be filed at random.

It is also an object of the present invention to provide an improved automatic filing system which is operated in response to a plurality of ways in which a document may be identified, so that the uniqueness of a given document may be established.

Another object of the present invention is the provision of an improved item retrieval system having the capability of locating a desired item, regardless of its position in an associated filing system.

In brief, particular arrangements in accordance with the present invention involve the encoding of items to be filed in accordance with various identifying characteristics prior to the filing of the item. The encoding may take the form of particularly located notches spaced along the edge of the item in binary code. Items so encoded are placed in specially constructed bins having selector mechanisms which may be selectively operated during the item retrieval process in accordance with the encoded identification of a desired item.

In accordance with an aspect of the invention, the selector mechanism is actuated so as to positively displace all items in a given bin which fail to correspond to the encoded identification of a desired item in any selected characteristic. Accordingly, when the bin selector mechanism is thus actuated, the selected item remains undisplaced in its original position in a given bin. Thereafter, in accordance with a further aspect of the invention, an extractor mechanism is actuated to extract the desired item from its orginal position in the bin for removal by an operator.

In one particular arrangement in accordance with the invention, the selector mechanism for locating a desired item within the filing system comprises a plurality of elongated thin selector bars disposed adjacent the notched edges of the encoded items. The selector bars have a thickness which is slightly less than the width of the individual notches in the associated encoded items. A retrieval control unit is associated with the bin storage system to control the actuation of the selector mechanism. The selector bars are selectively moved toward the groups of stored items within the storage bins by a lifting mechanism controlled by the retrieval control unit in accordance with the encoding thereof to select a desired item. In operation, selector bars corresponding to the binary code positions of the desired item identification are moved during the selection cycle. Thus, all of the items which do not correspond to the encoded identification of the selected item are displaced during the selection cycle, leaving the desired item in its original, undisplaced position. In this particular arrangement in accordance with the invention, an extractor mechanism is actuated immediately following the selection cycle so as to automatically extract from the storage bin those items which are not displaced and which therefore correspond to the encoded identification of the desired item. These extracted items are held in an extracted position for immediate removal by an operator of the system. Where the document sought has been uniquely identified, only the card bearing the reduced image of that document will be extracted.

The selector bars are individually moved by associated solenoids of the so-called push type. Each of these solenoids when energized pushes an armamture rod upwardly against its associated selector bar to perform the selector lifting function. Because the cards stored in the bin are configured with a recess to engage a member of the extractor mechanism, the selector solenoids need be energized for only a small fraction of the extraction cycle corresponding to the degree of rotation of the extractor mechanism during which the cards which have not been selected are required to clear the extractor. Therefore, in accordance with an aspect of the invention, a so-called 10° switch is provided to open the energizing circuit to the selector solenoids when the extractor mechanism has rotated through a predetermined angle, in this case 10°.

As the extractor mechanism is being restored to its down position, the stored cards are again lifted briefly in order to clear the extractor and permit it to become engaged with the card recesses. While this might be done by briefly energizing all of the selector solenoids, it is, in one particular embodiment of the invention, accomplished by the use of a camming mechansm which is engaged by the extractor mechanism during its return to the down position. As an engaged cam is rotated, an injector gate is lifted, thereby bearing against all of the stored cards and lifting them to clear the extractor as it is restored into a position to be engaged by the card recesses.

A particular bin unit with its extractor mechanism is arranged to be controlled by a number of control units, both local and remote. Moreover, the extractor mechanism is adapted to be addressed by a computer which may control the selection of one or more stored cards. Up limit and down limit switches are arranged to de-energize the motor driving the extractor mechanism when a limit of travel has been reached and also to perform other functions relating to the maintenance of control by remote or local control units. In accordance with another aspect of the invention, a fault indicator is provided which is arranged to indicate the presence of a fault if a cycle of operaton is not completed properly. In one specific arrangement, this is provided by a circuit incorporating a 1.5 second delay timer which is alternatively energized by the respective limit switches.

A better understanding of the present invention may be had from a consideration of the following detailed description, taken in conjunction with the accompanying drawings, wherein.

Figure 1:
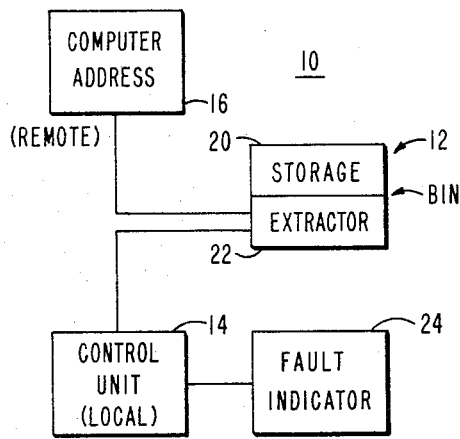
FIG. 1 is a block diagram representing one particular arrangement in accordance with the invention.

As represented in FIG. 1, one particular arrangement of an automatic filing system 10 in accordance with the invention comprises a bin unit 12 coupled to a local control unit 14 and to a computer address unit 16 which may also be considered equivalent to a remote control unit. As shown, the bin unit 12 comprises a storage section 20 and an extractor section 22. A fault indicator 24 is shown coupled to the control unit 14.

Figure 2:
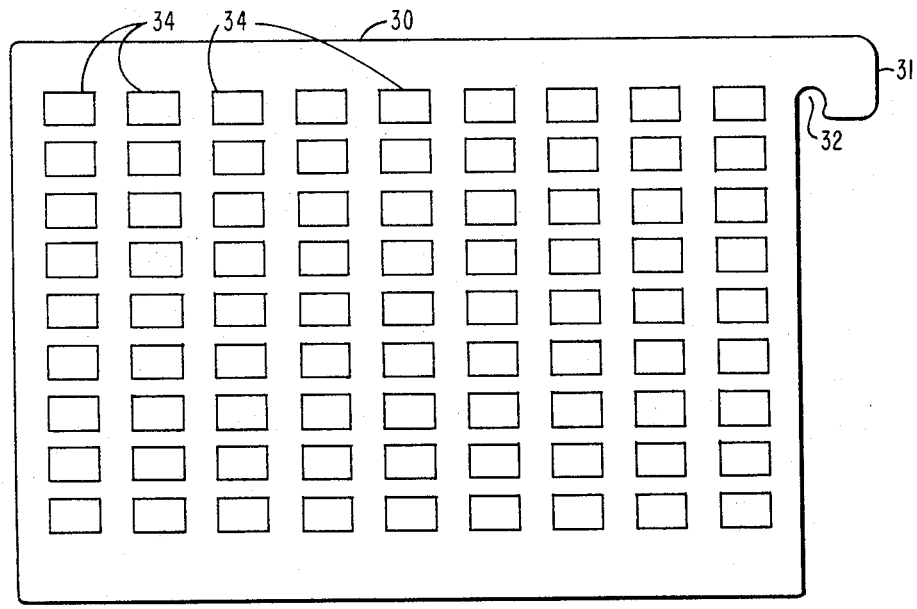
FIG. 2 is a representation of a card for use in the bin storage units of the present invention.

The storage section 20 of the bin unit 12 is adapted to receive stored items of a particular configuration. In one prefererd arrangement, a typical item is represented in FIG. 2 in the form of a card 30, substantially rectangular in shape, but with a projection 31 at one corner of the card defining a recess 32. This portion of the card is designed to engage a portion of the extractor as shown in FIG. 6. The card of FIG. 2 is adapted to store as reduced photographic images a large number of copies of documents. These may be pages of textbooks, copies of correspondence, or anything else which is to be stored in the system. For purposes of illustration, these reduced images 34 are represented in a matrix of nine rows and nine columns. However, one particular system for photographic reduction by microfilm techniques permits the storage of 2,500 such pages in a matrix of 50 by 50 on a card of the size depicted. When any particular stored document is to be viewed by an operator or reproduced, the card may be placed in a viewer suitably indexed to the location on the card of the particular document involved and magnified. Use of such a system in conjunction with the automatic filing system of the present invention advantageously permits the storage of an extremely large number of documents in a small space which may be conveniently located for rapid access on the desk of a file clerk for example. Typically, by using cards of approximately 4 by 6 inches, each containing photographically reduced copies of 2,500 pages of documents, some 1.4 million documents can be stored in a unit such as that depicted in FIG. 5 with ready access to any document for viewing in less than ten seconds.

Figure 3:
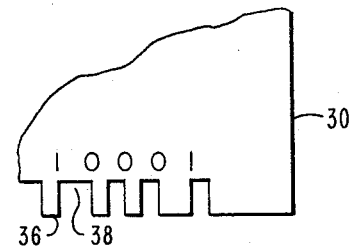
FIG. 3 is a representation of a portion of the card of FIG. 2 illustrating the manner of encoding the card.

FIG. 3 illustrates a portion of an encoded section of the card 30 of FIG. 2 in order to illustrate the manner in which binary code is employed for identifying the documents stored on a particular card 30. The portion shown in FIG. 3 represents 10 binary digit positions corresponding to a given character identification. Alphanumeric identification characters are employed and the basic code is abstracted from the International Teletype Code which employs a five digit binary code. As shown, a notch in the second of the two positions corresponding to a particular digit represents a binary 1 whereas a notch in the first of the two positions represents a binary 0. As shown in FIG. 3, the encoded edge of the card 30 is arranged with a plurality of shoulders 36 and notches 38 in accordance with the particular characters comprising the encoded identification. The particular configuration of shoulders 36 and notches 38 shown in FIG. 3 corresponds to the binary number 10001. Details of one particular device for marking a card 30 in accordance with a pre-selected code are set forth in my copending patent application identified hereinabove. Also one particular configuration of a switching instrument for controlling the selection of a desired card 30 in accordance with its coded edge strip is also set forth. Any arrangement for controlling the actuation and movement of the extractor-selector bar mechanism to select a desired card may be employed.

Figure 4:
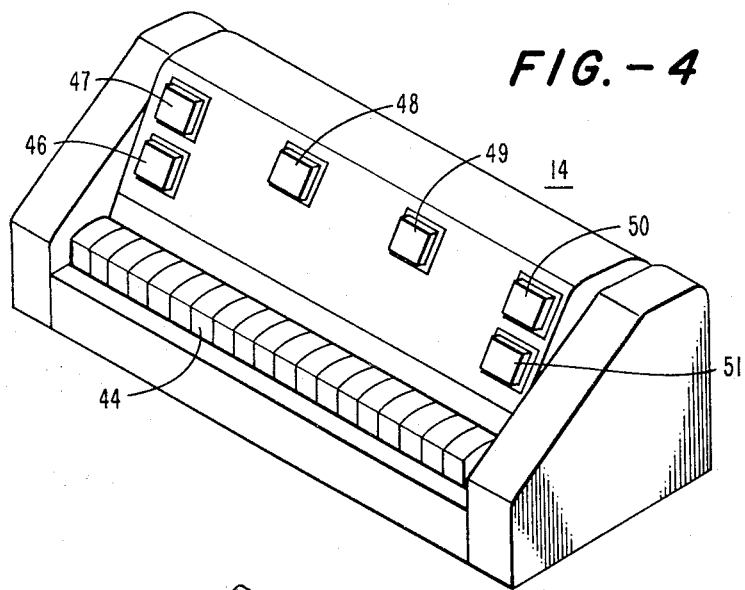
FIG. 4 is a perspective view of a control unit employed in the arrangement represented in FIG. 1.

FIG. 4 depicts a control unit 14 comprising a plurality of indicator lights and a plurality of selector keys 44. The indicator lights include a power-on light 46, a remote indicator light 47, a ready light 48, a sort complete light 49, a fault light 50, and an operate light 51. The operate light 51 is actually a housing for a pair of lights of different colors indicating different phases of the operate cycle. The circuit in which these lights are connected is shown in greater detail in FIG. 9. As represented in FIG. 4, the selected keys 44 comprise a plurality of two position switches for developing an identification of the particular stored item in binary code.

FIG. 1 is a perspective view of a particular configuration of a storage bin unit 12 having a plurality of cards 30 stored therein. As depicted the cards 30 are stored on edge along an inclined plane and at the upper rear corner of the cards 30 may be seen a portion of an extractor 41 engaging the recesses in the cards 30. In operation, the cards which do not correspond to a given selection code are lifted by the selector mechanism mounted within the unit 12 underneath the cards 30 so that they no longer engage the extractor 41. Thereafter, the extractor 41 is rotated and lifts partially out of the bin unit 12 the particular card or cards which have remained in place during the selection process as corresponding to the given selection code. Such a bin unit 12 as is depicted in FIG. 5 is of a size to match the dimensions of the control unit 14 of FIG. 4 and the two units together easily fit on the end of a standard size desk.

Figure 5:
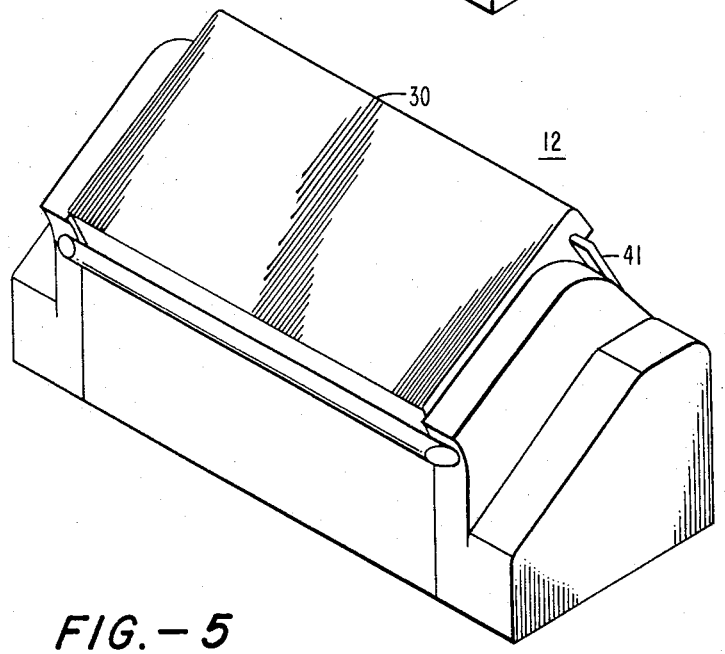
FIG. 5 is a perspective view of a storage bin with enclosed retractor unit which may be employed in the arrangement in FIG. 1.
Figure 6:
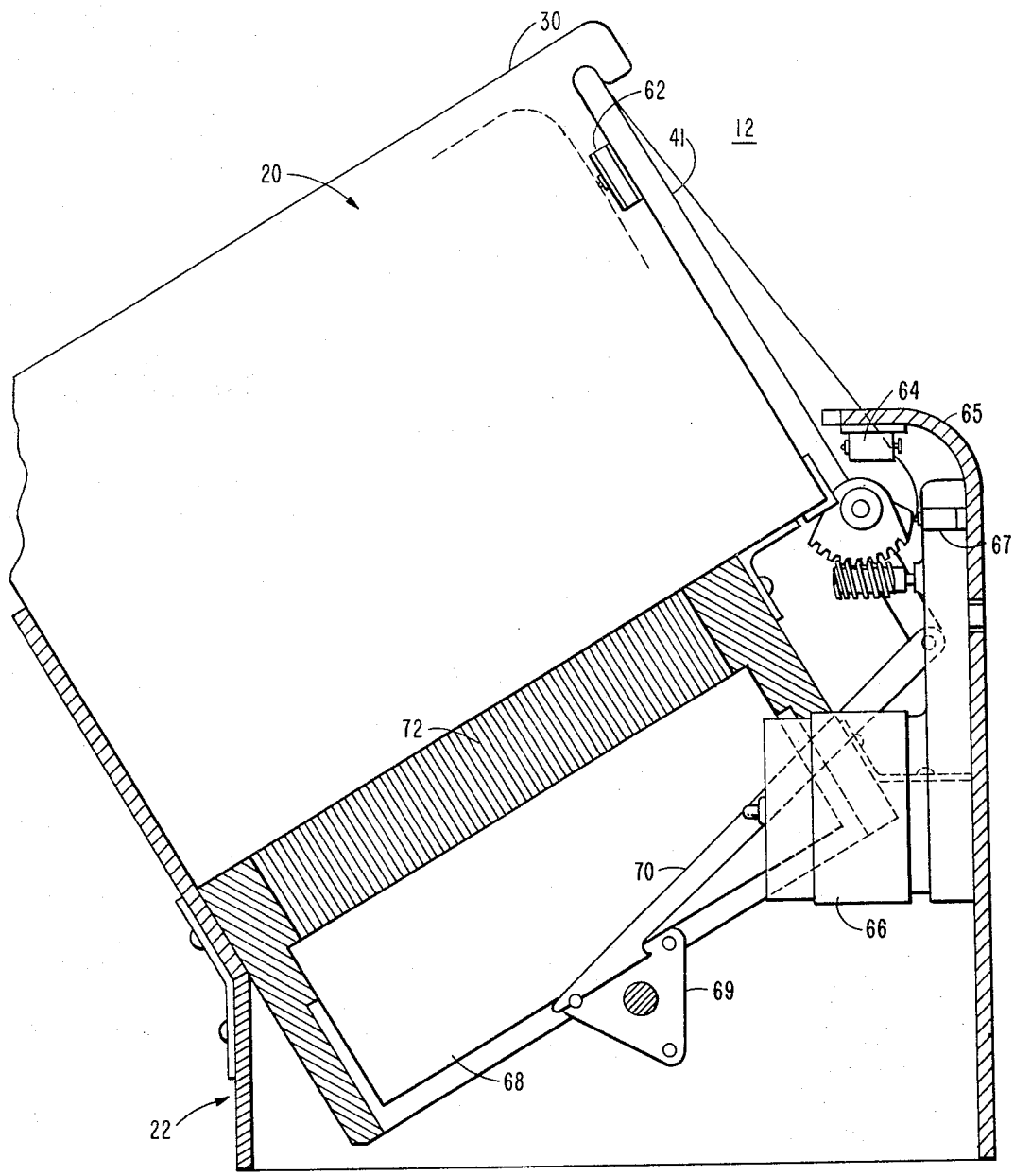
FIG. 6 is an end sectional view of the storage unit of FIG. 5.

FIG. 6 is an end sectional view of a portion of the bin unit 12 of FIG. 5 and shows particular portions thereof which are pertinent to a description of the operation of the mechanism. In this view, a card 30 is shown in the stored position with its recess engaged by an extractor 41. Attached to the extractor 41 is a down limit switch 62 arranged to be operated by an end of the bin unit 12 (partially shown in broken outline) when the extractor is in the down position. An up limit switch 64 is shown attached to the frame 65 of the unit in a position to be actuated by the extractor 41 when the latter is in its up position. The extractor 41 is driven by a gearing arrangement coupled to a motor 66 which is controlled in a manner to be described hereinbelow. A third switch 67, referred to as a 10° switch, is shown also mounted on the frame 65 and in a position to be actuated by a camming surface of the pivotal portion of the extractor 41 as the latter is rotated. This is adjusted to be operated when the extractor 41 has rotated through approximately 10° and is arranged to de-energize the selector solenoids at that point. An injector gate 68 is arranged adjacent an injector cam 69 which is rotated by an arrester arm 70 as the extractor 41 is being returned to its down position.

Figure 7A:
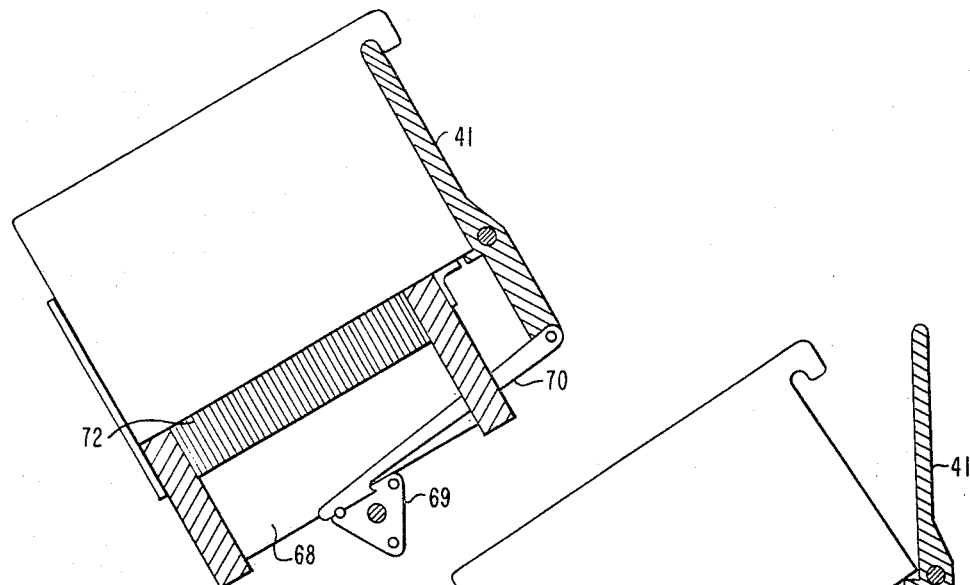
FIGS. 7A, 7B and 7C are schematic views similar to that of FIG. 6 showing the extractor mechanism in various phases of operation.
Figure 7B:
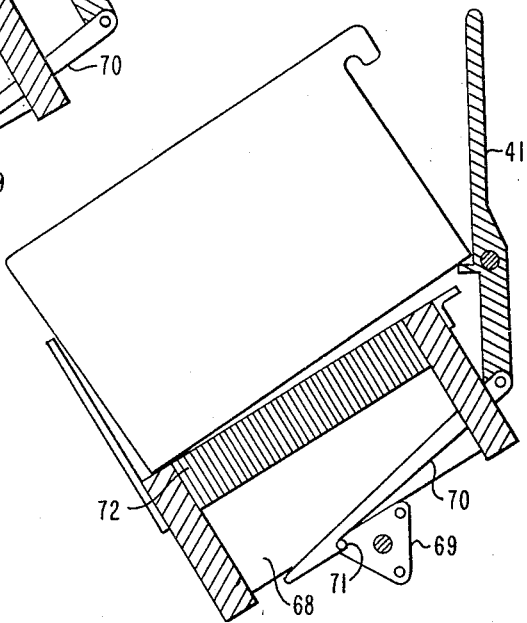
Figure 7C:
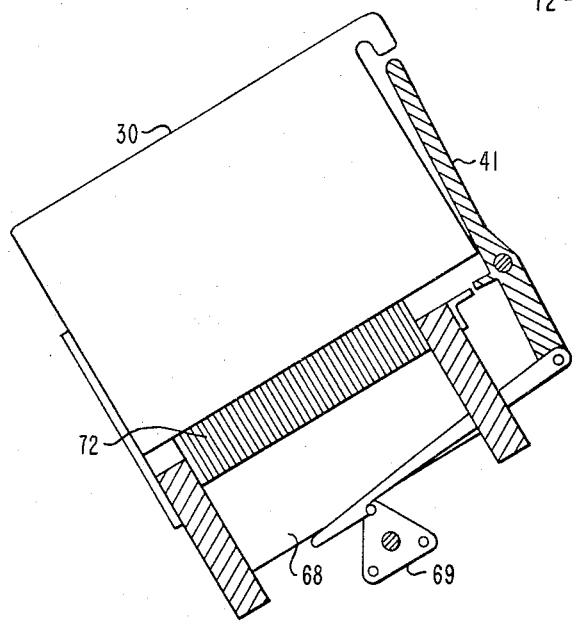

The operation of the extractor 22, which comprises the injector assembly of the injector gate 68 and cam 69, the selector mechanisms and the extractor 41 is seen better from a consideration of FIGS. 7A, 7B and 7C. FIG. 7A represents the mechanism in the rest or down position. It will be noted that the flat side of the triangular cam 69 is resting against the injector gate 68 so that the latter is in its down position with the selector bars 72 resting thereon. FIG. 7B shows the extractor 41 rotated to the up position at which time the arrester arm 70 engages a pin 71 at one lobe of the cam 69. Thereafter, as the extractor 41 is returned to the down position, the cam 69 is rotated, and in turn raises the injector gate 68 which raises all of the selector bars 72 and thereby all of the cards 30 to permit the upper edge of the extractor 41 to move underneath the protrusion at the corner of the card 30. Thus when the cards 30 are dropped to the store position, the extractor 41 is in a position as shown in FIG. 7A to engage the card recesses.

Figure 8:
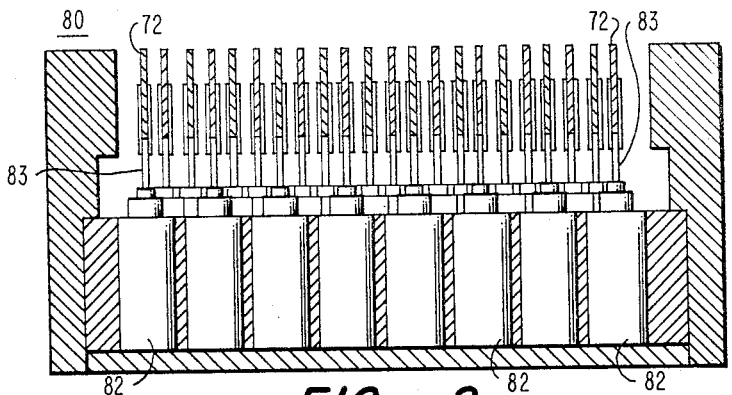
FIG. 8 is a sectional view showing the selector solenoids and associated selector bars which comprise a portion of the bin storage unit of FIG. 5.

FIG. 8 depicts a selector solenoid assembly 80 which may be positioned underneath the stored cards 30 behind the injector gate 68 in the view of FIG. 6. The solenoid assembly 80 comprises a plurality of solenoids 82 arranged in staggered rows. Each of the solenoids 82 is of the push type and has a push rod 83 which moves upwardly when the associated solenoid 82 is energized. The push rod 83 is returned to a downward position under spring pressure when its solenoid 82 is de-energized. Each push rod 83 is engaged at the lower edge of a selector bar 72 which is arranged to grip the end of the push rod 83 for positive engagement. Thus a selector 72 is pushed upward and withdrawn downward in sequence whenever its corresponding solenoid 82 is energized by virtue of the coupling to the solenoid push rod 83. Typically, two sets of solenoid mechanisms 80 are provided for each bin unit 12, one set at each end of the elongated selector bars 72. In operation, a negative selection function is performed whereby the solenoids 82 corresponding to the particular code of the card which is to be selected are not energized while all of the remaining solenoids are energized. The corresponding selector bars 72 are thereby raised and lift with them the cards which do not correspond to the particular card bearing the selected code. Thus, when the extractor mechanism is rotated, only the selected card is engaged by the extractor and thereupon is lifted out of the bin for removal by an operator or some automatic mechanism not shown.

Figure 9:
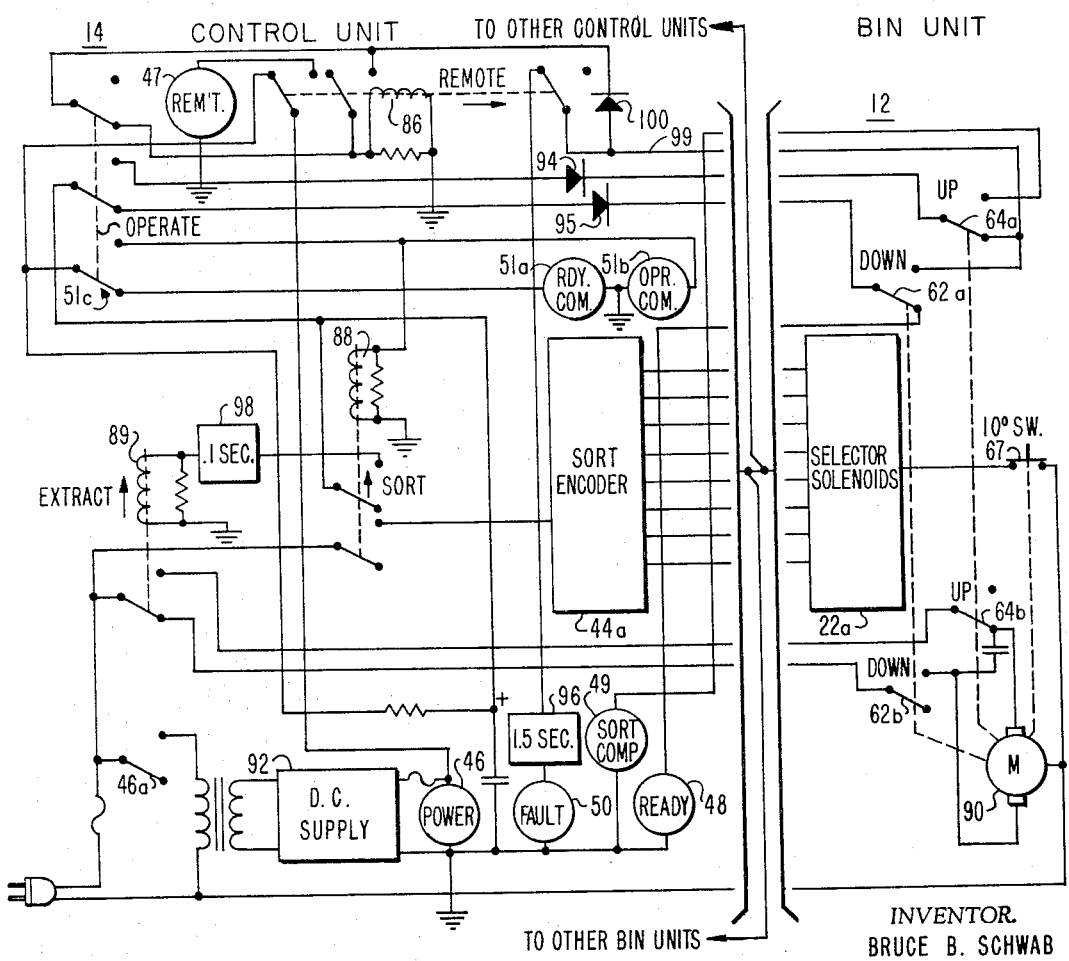
FIG. 9 is a schematic diagram of the electrical circuit employed in one particular arrangement of the extractor of FIG. 1.

FIG. 9 is a schematic diagram showing the circuitry employed in the control unit 14 and the bin unit 12 to provide the described operation of the present invention. The control unit portion of the circuit includes the various indicator lights as described in connection with FIG. 4 in which the same reference numerals are employed insofar as possible. The operate indicator light 51 (FIG. 4) actually comprises a pair of lights of different colors: the ready command light 51a which is white and the operate command light 51b which is amber. Only one of the lights 51a, 51b is energized at any given instant and both are arranged to illuminate the indicator 51, which is also a pushbutton switch, designated 51c in FIG. 9, which serves as an operate switch for the circuit. A sort encoder 44a, corresponding to the selector buttons 44 of FIG. 4, is included in FIG. 9 with circuit connections to the selector mechanism 22a in the bin unit 12. The mechanism 22a comprises the solenoids 82 of FIG. 8, and only those solenoids 82 which are selected by the sort encoder 44a are energized when the extractor is operated. The circuit of the control unit 14 also includes a remote relay 86, a sort relay 88, and an extract relay 89. A power switch 46a is incorporated in conjunction with the power light 46 for similar pushbutton operation. The circuit of the bin unit 12 further includes a motor 90 coupled mechanically to down limit switches 62a and 62b, up limit switches 64a and 64b, and a 10° switch 67. These switches are controlled by the motor 90 but at different times during the operate cycle of the motor as indicated by the separate mechanical coupling paths represented by the broken lines therebetween.

In operation, the sort encoder 44a is initially set to select a particular card which is stored at random in the bin unit 12. Then the operate switch 51c is operated by pushing the button 51. This should be done only if the white ready command light 51a is illuminated, but pushing the button 51 will have no effect if the bin unit 12 is being operated by a remote unit. DC power from a supply 92 is fed to the operate switch 51c through the left-hand contact of the remote relay 86 and if the bin unit is being controlled from another control unit 14 (remote), the local unit remote relay 86 will be energized and power will be removed from the operate switch 51c and thereby withheld from the circuits controlled by this switch.

Assuming that the system is ready for control by the local unit 14, operating the switch 51c moves its contacts to their upper positions which respectively disable the operate switch path to the remote relay 86, apply power via a diode 94 to the 1.5 second delay timer 96 of the fault light 50 via a path through the up limit switch contact 64a, and apply power to energize the operate command light 51b (removing power from the ready command light 51a) and energize the sort relay 88. When energized, the sort relay 88 closes contacts which apply power to a .1 second delay timer 98 in series with the extract relay 89 and also apply AC power through the sort encoder 44a to energize the various selected solenoids 82 of the mechanism 22a from which a return circuit path is provided through the 10° switch 67. Following the .1 second delay established by the timer 98, the extract relay 89 is energized and its contacts close a path to apply AC power to the motor 90 via the up limit switch contacts 64b. This circuit energizes the motor to operate in a direction to move the extractor 41 (FIG. 6) toward its up position. As the extractor 41 rotates through approximately 10°, an angle sufficient to permit it to clear the apertures of the cards 30 which are lifted by the selector bars 72 driven by the selector solenoids 82, the 10° switch 67 is opened to remove power from the selector solenoids 82. The motor 90 continues to drive the extractor 41 toward its up position until the up limit switches 64a and 64b are moved to their upper contact positions. The contacts 64b thereupon break the circuit to the motor 90 to stop further movement thereof. Contacts 64a interrupt the path which has been supplying power to the 1.5 second delay timer 96 of the fault indicator 50 and close a path to energize the sort complete light 49. Thus, the fault light 50 is not energized under normal operation in this fashion, since a sequence of operations as described takes substantially less than 1.5 seconds. However, should there be a fault in the operation which prevents the extractor 41 from reaching its upper position and transferring the contacts of the up limit switch 64a within 1.5 seconds, the timer 96 will energize the fault light 50 to indicate trouble in the device.

The selected card will have been extracted from the bin by the above described operation. Thereafter, switching the contacts of the operate switch 51c to the downward position restores the circuit to normal and provides power via a diode 95 and the contacts 62a of the down limit switch, now in the upper position, to again start the 1.5 second delay timer 96. The sort relay 88 is also de-energized which in turn releases the extract relay 89, the contacts of which in the lower position energize the motor 90 via the closed contacts of the down limit switch 62b to rotate the extractor 41 toward its down position. When the extractor 41 is restored to the down position, the down limit switch contacts 62a and 62b are moved to their lower position, breaking the energizing circuit to the motor 90 and also to the 1.5 second timer stage 96 coupled to the fault light 50. Again, if the motor 90 does not complete its cycle to restore the extractor 41 to the down position within 1.5 seconds, the timer stage 96 energizes the fault light 50 to indicate trouble in the device. The ready light 48 is again energized by the circuit including the down position contact 62a, as is the ready command light 51a via the operate switch 51c.

The remote relay 86 is provided to prevent operation of a particular control unit 14 during the time interval when the bin unit 12 is being controlled by a remote control unit. When the operate switch 51c of a remote control unit 14 is moved to the upper position, preparatory to initiating a bin unit sort, DC power is supplied via the diode 94 in the remote control unit 14 to the cathode side of the diode 94 in each of the individual control units 14. Since the operate switch 51c of each of the control units 14 except the particular remote unit which is being operated at a given time is in the lower position, power is applied from the diode 94 via a diode 100 and through the upper contacts of the switch 51c to energize the remote relay 86 of the local control unit 14. The contacts of the remote relay 86 are thereupon moved to the right and perform three functions: the left-hand contacts remove DC power from the operate switch 51c and energize the remote indicator light 47; the center contacts close a holding circuit for the remote relay 86 via a lead 99; and the right-hand contacts remove power from the 1.5 second delay timer 96 of the fault indicator circuit. Because the lead 99 is energized via contacts 64a during the upward travel of the extractor 41, the remote relay 86 is energized by its operate path so long as the operate switch 51c of the remote unit is in its upper position. Of course, in the particular control unit 14 which is being operated, the remote relay 86 cannot be energized, because the contacts of the operate switch 51c of this unit are in the upper position.

When the remote control unit operate switch 51c is returned to the lower position, in order to restore the extractor bin unit 12 to its down position, power is applied through the diode 95 and the contacts 62a in the upper position to the lead 99 and the holding path of the remote relay 86. Thus, the remote relay 86 is continued energized until the lead 99 is de-energized by the restoration of the down limit switch contacts 62a to their down position, and all local control units 14 are restored to the ready condition.

There has thus been described above one particular arrangement of an automatic filing system in accordance with the invention which provides for compact and convenient storage of documents which may be filed on a random basis and immediately retrieved for inspection or copying, the actual retrieval operation being performed in less than 1.5 seconds. The described arrangement is particularly adapted for use in conjunction with viewing and reproducing apparatus capable of selecting a given selected microfilmed portion of the storage card and reproducing the selected portion in the actual size of the original document. The entire operation, including selection and reproduction can easily be performed in less than 10 seconds for any one of over a million documents stored in a given bin unit. Additional bin units may be provided with all of the bin units being controlled simultaneously, thus permitting all of the storage bin units to be searched in substantially the same time required for a single bin unit.

Although there has been described above a specific arrangement of an automatic filing system in accordance with the invention for the purpose of illustrating the manner in which the invention may be used to advantage, it will be appreciated that the invention is not limited thereto. Accordingly, any and all modifications, variations or equivalent arrangements falling within the scope of the annexed claims should be considered to be a part of the invention.

What is claimed is:

1. An arrangement for automatically retrieving a selected item from file storage, each of said items being encoded along an edge in accordance with an identification thereof, comprising: a storage bin for storing said items, means associated with said storage bin for rejecting all but the selected item, an extractor mechanism associated with the storage bin and operable to remove the item not rejected by said rejecting means, and fault indicator means coupled to the extractor mechanism for indicating a fault if the extractor mechanism does not complete a cycle of operation within a predetermined time after being actuated.

2. An arrangement for automatically retrieving a selected item from file storage, each of said items being encoded in accordance with an identification thereof, comprising: a storage bin for storing said items, means associated with the storage bin for rejecting all but the selected item, means for controlling the rejecting means in accordance with the identification code of a selected item, an extractor mechanism associated with the storage bin and operable to remove the item not rejected by said rejecting means, and fault indicator means coupled to the extractor mechanism for indicating a fault if the extractor mechanism does not complete a cycle of operation within a predetermined time after being actuated.

3. An arrangement in accordance with claim 2 wherein said controlling means includes an operate switch for initiating an operate cycle comprising the selective energization of the rejecting means and the operation of the extractor mechanism, and means for disabling the operate switch from initiating said operate cycle in the event that the storage bin is controlled by a remote controlling means and for maintaining said operate switch disabled during the period of control by said remote controlling means.

4. An arrangement for automatically retrieving a selected item from file storage, each of said items being encoded in accordance with an identification thereof, comprising: a bin for storing the items, means associated with the storage bin for rejecting all but the selected item in response to an applied identification code, an extractor mechanism associated with the storage bin and operable to remove the item not rejected by the rejecting means, fault indicator means coupled to the extractor mechanism for indicating a fault if the extractor mechanism does not complete a cycle of operation within a predetermined time after being actuated, and a plurality of limit switches coupled to the extractor mechanism for determining the limits of travel thereof.

5. An arrangement in accordance with claim 4 wherein the fault indicator means includes a timer providing a predetermined time delay and said limit switches are also coupled to alternatively control said timer at different points in the cycle of operation of the extractor mechanism.

6. An arrangement for automatically retrieving a selected item from file storage, each of said items being encoded along an edge in accordance with an identification thereof, comprising: a storage bin for storing a plurality of said items, means including a plurality of selector bars positioned along the encoded edge of the stored items and operable to reject all but the selected item, a plurality of solenoids, individually coupled to the selector bars and individually operable to move the associated selector bars, means for selectively energizing the solenoids in accordance with the identification code of a selected item to cause the selector bars to reject all but the selected item, an extractor mechanism associated with the storage bin and operable to remove from the storage bin the item not rejected by the selector bars, and controlling means including means for successively selectively energizing the solenoids, energizing the extractor mechanism to initiate the operation of the extractor mechanism, and de-energizing the energized solenoids while permitting the extractor mechansm to continue its cycle of operation to remove the selected item.

7. An arrangement in accordance with claim 6 wherein said extractor mechanism includes a motor energizable by the control means for rotating the extractor mechanism through a first predetermined angle and a switch operable at a second predetermined angle of rotation of the extractor mechanism less than said first predetermined angle, said switch being connected in circuit with all of said solenoids for de-energizing the energized solenoids.

8. An arrangement in accordance with claim 6 wherein said extractor mechanism includes a member configured to engage a projecting portion of said filed items and a switch coupled to all of said solenoids for interrupting the circuit thereto when the extractor mechanism has been rotated through an angle sufficient to clear the projecting portions of the filed items.

9. An arrangement for automatically retrieving a selected item from file storage, each of said items being encoded along an edge in accordance with an identification thereof, comprising: a storage bin for storing said items, means associated with the storage bin and including a plurality of selector bars for rejecting all but the selected item, an extractor mechanism associated with the storage bin and operable to remove from the storage bin the item not rejected by the rejecting means, an injector mechanism coupled to the extractor mechanism for moving all of said selector bars at the conclusion of a cycle of operation of the extractor mechanism, said injector mechanism comprising an injector gate adjacent the selector bars, a rotatable cam positioned to actuate the injector gate upon being rotated, and a lever coupled to the extractor mechanism and arranged to rotate said cam only during the interval when the extractor mechanism is being restored to a position of engagement with the stored items.

References Cited

UNITED STATES PATENTS

| 3,292,631 | 12/1966 | Cross | 129—16.1 |
| 1,889,635 | 11/1932 | Casey | 129—16.1 |
| 2,501,492 | 3/1950 | Bergsten et al. | 129—16.1 |
| 2,645,226 | 7/1953 | Walker et al. | 129—16.1 |
| 2,774,821 | 12/1956 | Brown et al. | 129—16.1 |
| 3,266,497 | 8/1966 | Bleiman | 129—16.1 |

FOREIGN PATENTS 376,393  7/1932  Great Britain.

ALLEN N. KNOWLES, *Primary Examiner.*

M. HENSON WOOD, JR., *Examiner.*